United States Patent [19]

Randaccio

[11] Patent Number: 4,643,810

[45] Date of Patent: Feb. 17, 1987

[54] PHOTOCHEMICAL PROCESS TO ELIMINATE LEAD IN GASOLINE WITH A HIGH OCTANE NUMBER

[75] Inventor: Carlo Randaccio, Bologna, Italy

[73] Assignee: Vittorio Spada, Madrid, Spain

[21] Appl. No.: 719,916

[22] Filed: Apr. 4, 1985

[30] Foreign Application Priority Data

Apr. 10, 1984 [IT] Italy ................................ 3419 A/84

[51] Int. Cl.$^4$ .............................................. B01J 19/12
[52] U.S. Cl. ............................ 204/157.3; 204/157.41; 204/157.48; 204/158.21; 210/748
[58] Field of Search ........... 204/158 P, 162 R, 157.41, 204/157.48, 157.5, 158.21, 157.3, 158.2; 210/748

[56] References Cited

U.S. PATENT DOCUMENTS

| | | | |
|---|---|---|---|
| 1,674,020 | 6/1928 | Oberle | 204/162 R |
| 2,450,099 | 9/1948 | Thompson | 204/162 R |
| 3,277,202 | 10/1966 | Benson et al. | 204/162 R |

*Primary Examiner*—Howard S. Williams
*Attorney, Agent, or Firm*—Wood, Dalton, Phillips, Mason & Rowe

[57] ABSTRACT

A process to eliminate lead in gasoline, at the same time maintaining a high octane number in the gasoline, by irradiating leaded gasoline, at room temperature and pressure, with U. V. rays, which generate free organometallic radicals which facilitate a photochemical reaction with the gasoline, eliminating "moloxides" responsible for the reduction in the gasoline's octane number. In this manner an up-graded gasoline is obtained, which is completely lead-free, and prevents atmospheric pollution.

5 Claims, No Drawings

PHOTOCHEMICAL PROCESS TO ELIMINATE LEAD IN GASOLINE WITH A HIGH OCTANE NUMBER

APPLICATIONS

The present invention relates to a process for the production of improved gasoline which is lead-free, and represents a particularly improved technology from the point of view of production economy.

BACKGROUND OF THE INVENTION

The current trend of engine manufacturers is to increase the engine compression ratio in order to obtain increased power together with a reduction in fuel consumption. This requires a gasoline with a very high anti-knock tendency.

Gasoline is a mixture of hydrocarbons with a tremendously variable tendency for knocking. To avoid this problem and consequently raise the octane number as close as possible to 100 (in the case of mixtures of purely isooctane gasolines), anti-knock compounds such as tetraethyl-lead and tetramethyl-lead have been used.

Although these products have proved to have the best performance with regard to their cost/effectiveness ratio, they have generated very important atmospheric pollution problems.

For this reason, the legislation of most industrial countries envisage an even greater reduction of lead levels in gasoline, with total elimination foreseen by the beginning of next decade.

Batches of non-lead gasoline sold so far on the market have not managed to satisfy users because of their very low anti-knock, tendency. On the other hand, obtaining up-graded gasoline using cracking and similar processes would result in price increases due to the large investments required, which could hardly be absorbed by small refineries.

On the other hand, catalytic filters are very expensive in proportion to their short life, reduce engine power, and at the same time considerably increase fuel consumption.

However, this invention will allow up-graded gasoline, as required by the market, to be produced by a simple method and low cost.

DESCRIPTION OF PREFERRED EMBODIMENTS

As per this process gasoline, in which tetraethyl-lead, "Pb($C_2H_5$)$_4$", or tetramethyl-lead, "Pb($CH_3$)$_4$", present in amounts required to obtain a higher octane number, is irradiated at room temperature and pressure with U.V. rays obtained from a Mercury vapour lamp. The organo metallic compound is consequently decomposed by Quanta of light and precipitates as lead compounds which can be eliminated by filtration.

As is well known in the art, tetraethyl-lead or tetramethyl-lead is added to gasoline in the form of a liquid, conventionally known as "ethyl fluid" or "methyl fluid", respectively, which contains approximately 18 weight percent ethylene dibromide and 18 weight percent of ethylene dichloride;

The action of the U.V. rays consists in a photochemical reaction with the resulting formation of free organometallic radicals which eliminate "moloxides" in fuel.

The reaction is carried out following Einstein's Law, as follows:

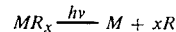

in which:
M = metal
R = hydrocarbon radicals
h = Planck's constant
x = the valence of m
v = Wavelength (in Å).

It is presently a common practice to improve the octane number of gasoline by the addition of tetraethyl-lead or tetramethyl-lead. These compounds generate free radicals by thermal decomposition in the engine cylinder during combustion of the gasoline. These free radicals react with the "moloxides" present in the gasoline, thereby avoiding detonation, but discharging great amounts of halogenated lead compounds into the atmosphere.

According to the present invention, the free radicals are generated by the U.V. rays, at room temperature and pressure, acting on the gasoline, with the reduction action being effected before the use of the gasoline. In this manner the lead becomes insoluble in the gasoline, hence its elimination through filtration, resulting in their not being found in the exhaust gases of the engines and at the same time obtaining 100 octane fuel.

The radiant energy may be supplied favorably either in continuous manner or in intermittent sequence. It may also be supplied in the form of a laser beam.

Tetraethyl-lead or tetramethyl-lead is mixed with ethylene dibromide, $C_2H_4Br_2$, ethylene dichloride, $C_2H_4Cl_2$, and mixtures thereof, in a manner already known, and which are decomposed by U.V. rays and which act as sensitizers which favor the elimination of lead in the form of halogenate compounds.

The reaction may be brought about by using any photosensitive compound, with the formation of free radicals with reduction action. The reaction may be effected either in liquid or in gaseous form. The precipitated metal may be recovered afterwards by filtration.

The process of the present invention is exemplified hereinafter, the example not to be taken as a limitation of the coverage of this invention.

EXAMPLE

A gasoline with 80 octane number (NO RM-Research Method), loaded with tetraethyl lead fluid or tetramethyl-lead fluid having a lead content of 0.8 gms/lt. approximately, is subjected to radiation, either in continuous or pulsating manner, with ultraviolet rays having a wavelength of between 2,000 to 5,000 Å, to precipitate the lead in the form of halogenates.

The gasoline thus treated has an octane number of 100 and is absolutely lead-free.

The reaction is instantaneous and the overall quantum yield very high.

The increase in lead, as compared with the amount cited above, can produce a gasoline with an octane number even higher than 100.

I claim:

1. A process to eliminate lead in gasoline with a high octane number, wherein gasoline containing an organometallic lead compound selected from the group consisting of tetraethyl-lead, tetramethyl-lead and mixtures thereof and an organic halogen compound selected from the group consisting of ethylene dibromide, ethylene dichloride and mixtures thereof is subjected to radiation using ultraviolet rays, at room temperature and pressure, the rays having a wavelength between 2,000 and 5,000 Å, to provoke the formation of free radicals with reduction action on the gasoline, and the precipitation of the lead in the form of insoluable lead halogenates; and separating the resulting lead by filtration.

2. A process according to claim 1, wherein the radiation is effected either in continuous or in pulsating manner.

3. A process according to claim 1, wherein the radiation is effected with laser.

4. A process according to claim 1, wherein sunlight is used as the radiation energy in combination with another source of light energy.

5. A process according to claim 1, wherein the process is effected either in liquid or in gaseous form.

* * * * *